(12) United States Patent
Guo et al.

(10) Patent No.: US 8,570,602 B2
(45) Date of Patent: Oct. 29, 2013

(54) DIGITAL HALFTONING METHOD AND METHOD FOR CONSTRUCTING CLASS TILING MAP

(75) Inventors: Jing-ming Guo, Taipei (TW); Yun-fu Liu, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 325 days.

(21) Appl. No.: 13/153,386

(22) Filed: Jun. 3, 2011

(65) Prior Publication Data

US 2012/0176650 A1   Jul. 12, 2012

(30) Foreign Application Priority Data

Jan. 10, 2011   (TW) .............................. 100100824 A

(51) Int. Cl.
*H04N 1/40* (2006.01)
*G06K 15/00* (2006.01)

(52) U.S. Cl.
USPC .......................... 358/3.05; 358/2.1; 358/3.24

(58) Field of Classification Search
USPC ......................................... 358/3.05, 2.1, 3.24
See application file for complete search history.

(56) References Cited

U.S. PATENT DOCUMENTS

| 8,077,355 B2 * | 12/2011 | Guo et al. ..................... 358/3.03 |
| 8,390,890 B2 * | 3/2013 | Guo et al. ..................... 358/3.03 |
| 2010/0033764 A1 * | 2/2010 | Guo et al. ..................... 358/3.03 |

* cited by examiner

*Primary Examiner* — Twyler Haskins
*Assistant Examiner* — Michael Burleson

(57) ABSTRACT

A digital halftoning method and a method for constructing a class tiling map are disclosed. The present invention utilizes to arrange class matrixes in a staggering form such that adjacent class matrixes exist a staggering shift. Also, the class tiling map is constructed in this way. Then, a dot diffusion procedure is performed to an original image with the class tiling map so as to generate a halftone image corresponding to the original image. The present invention is capable of solving the problem of a periodic appearance caused by traditional dot diffusion.

10 Claims, 23 Drawing Sheets

|    |    |    |    |    |    |    |    |
|----|----|----|----|----|----|----|----|
| 34 | 48 | 40 | 32 | 29 | 15 | 23 | 31 |
| 42 | 58 | 56 | 53 | 21 | 5  | 7  | 10 |
| 50 | 62 | 61 | 45 | 13 | 1  | 2  | 18 |
| 38 | 46 | 54 | 37 | 25 | 17 | 9  | 26 |
| 28 | 14 | 22 | 30 | 35 | 49 | 41 | 33 |
| 20 | 4  | 6  | 11 | 43 | 59 | 57 | 52 |
| 12 | 0  | 3  | 19 | 51 | 63 | 60 | 44 |
| 24 | 16 | 8  | 27 | 39 | 47 | 55 | 36 |

FIG. 3A

| 1 | 2 | 1 |
|---|---|---|
| 2 | x | 2 |
| 1 | 2 | 1 |

| 26 | 15 | 11 | 42 | 41 | 37 | 12 | 7 |
|----|----|----|----|----|----|----|----|
| 27 | 32 | 33 | 5  | 10 | 16 | 23 | 4 |
| 13 | 17 | 18 | 19 | 20 | 21 | 14 | 40 |
| 6  | 45 | 44 | 8  | 0  | 29 | 39 | 47 |
| 49 | 34 | 25 | 43 | 38 | 28 | 24 | 48 |
| 51 | 9  | 36 | 35 | 31 | 22 | 1  | 50 |
| 53 | 46 | 3  | 2  | 30 | 56 | 58 | 52 |
| 55 | 57 | 59 | 60 | 62 | 63 | 61 | 54 |

FIG. 16A

| 0.34549 | 1 | 0.34549 |
|---------|---|---------|
| 1       | x | 1       |
| 0.34549 | 1 | 0.34549 |

FIG. 16B

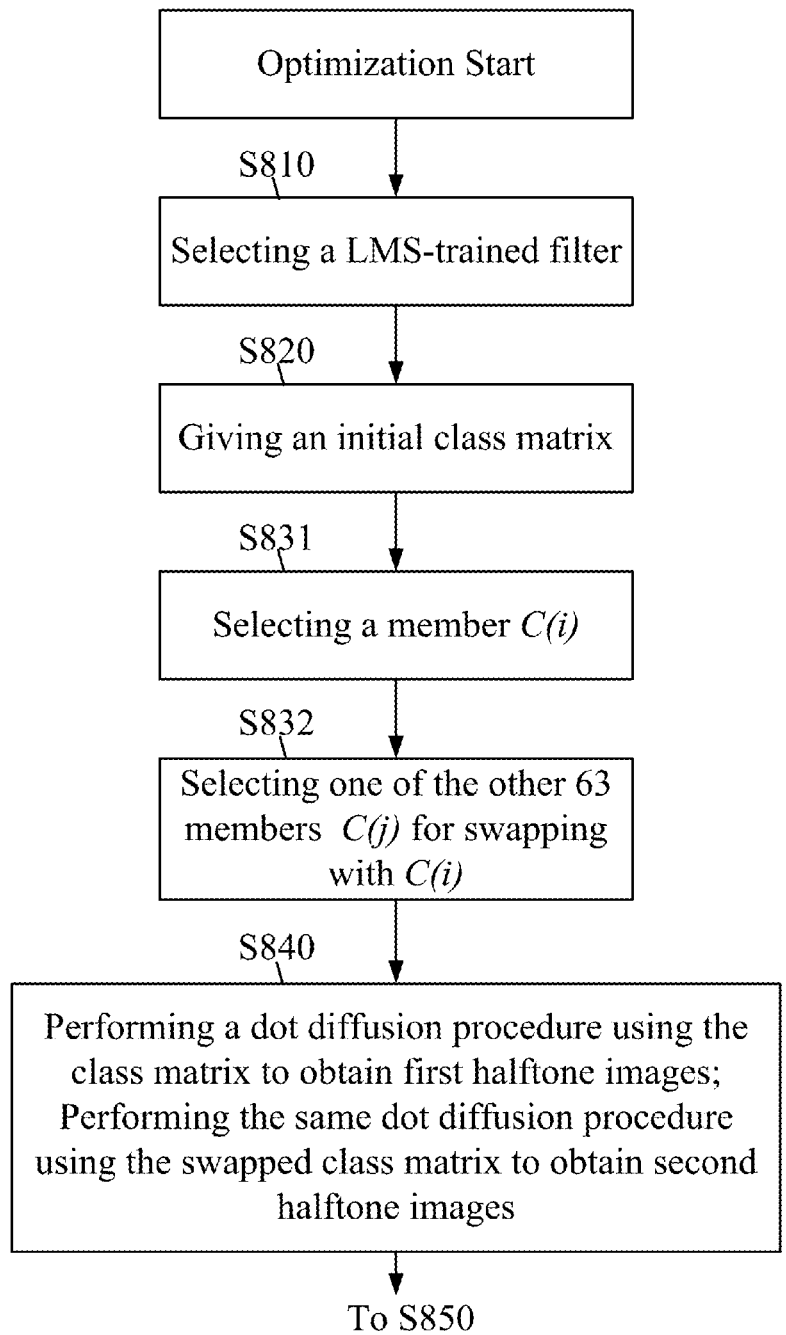
FIG. 18A(1)

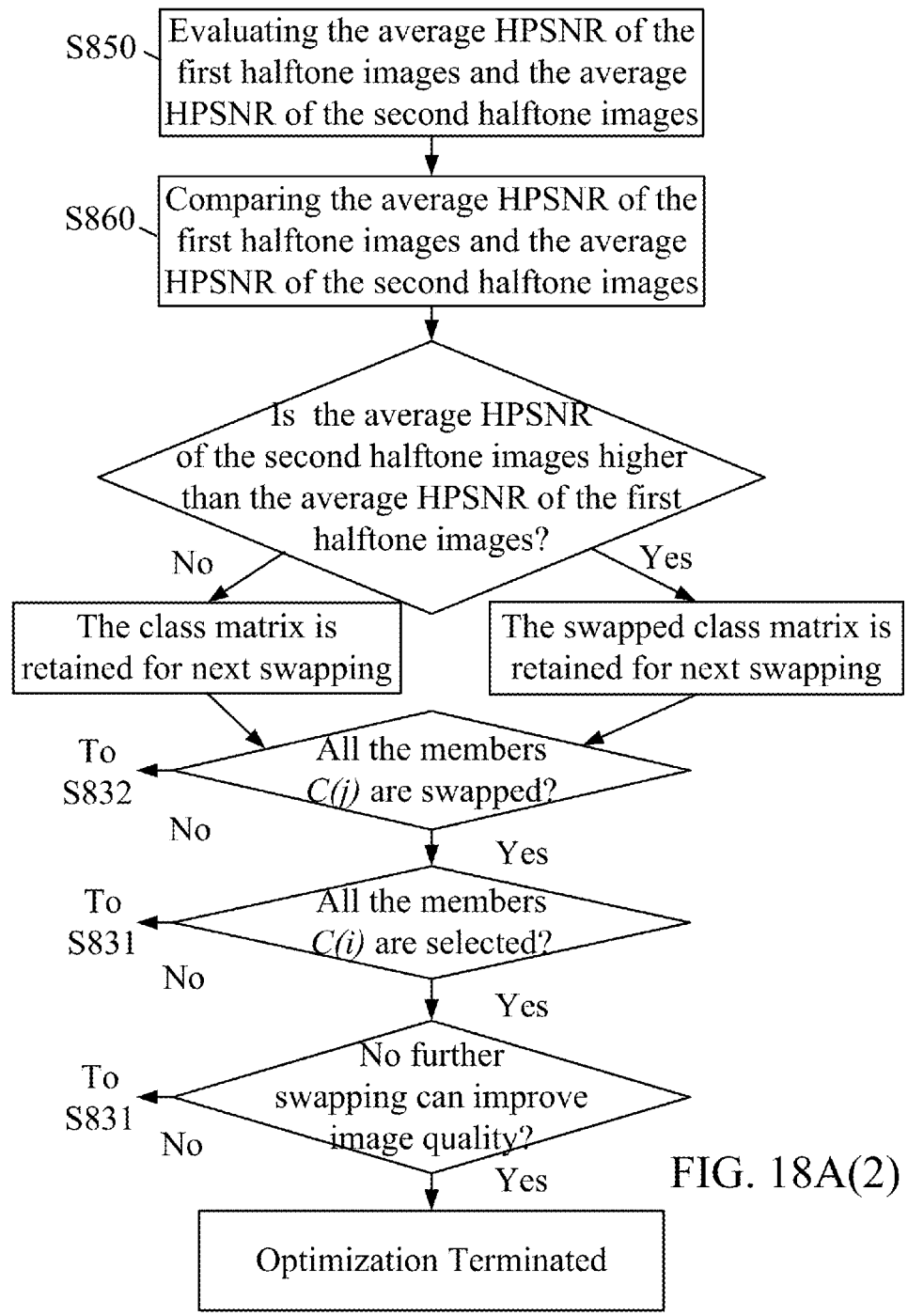
FIG. 18A(2)

DIGITAL HALFTONING METHOD AND METHOD FOR CONSTRUCTING CLASS TILING MAP

TECHNICAL FIELD OF THE INVENTION

The present invention relates to a digital halftoning method and a method for constructing a class tiling map for printing applications, and more particularly, to a digital halftoning method and a method for constructing a class tiling map based upon dot diffusion.

BACKGROUND OF THE INVENTION

Digital halftoning is a printing technique being widely used in printing computer printer-outs, printed materials, books, newspapers, and magazines, for example. When printing the aforesaid items, original images are changed into halftone images initially. This technique which is to transform an appearance of a continuous tone image into a halftone image is called halftoning.

There are various kinds of halftoning methods, including ordered dithering, error diffusion, dot diffusion, and so on. The ordered dithering is a parallel processing method. Although the ordered dithering has an advantage of possessing a higher processing efficiency, the halftone images acquired by using the ordered dithering, however, are in poor quality. The error diffusion being used is resulting in a better halftone image quality, however, the error diffusion is lacking an advantage of parallel processing. The dot diffusion possesses a harmonious proportion in the image quality and image processing efficiency, however, a serious problem of a periodic appearance occurs with the halftone images generated by using the dot diffusion. These are reasons that the dot diffusion is unable to replace the error diffusion and has not become a mainstream in the market.

FIG. 1A is a diagram showing an original image. FIGS. 1B to 1D are diagrams showing halftone images respectively acquired by performing ordered dithering, error diffusion, and dot diffusion to the original image. As shown in FIG. 1D, the halftone image acquired by using the dot diffusion is provided with a periodic dot distribution and the texture is quite unnatural.

In the following paragraphs, a basic concept of dot diffusion will be described. Referring to FIG. 2, an original image of size P×Q is divided into a plurality of non-overlapping blocks of size M×N. Each block is processed with the dot diffusion, independently. Then, the halftone results for each block are combined according to their original positions and thereby obtaining the halftone image corresponding to the original image. Two important media called a class matrix (CM) and a diffused matrix (DM), which are respectively illustrated in FIGS. 3A and 3B as an example, are used in the dot diffusion process. The class matrix is the same size as each divided M×N block, and all the blocks use the same class matrix. As shown in FIG. 3A, the class matrix records a sequence to process each pixel in an image block. A small number means the corresponding pixel is processed in advance and a large number means the corresponding pixel is processed relatively late. As shown in FIG. 3B, the diffused matrix records diffused weightings for propagating errors to neighbor pixels. A notation x denotes a current processing pixel.

FIG. 4 is a flow chart of the dot diffusion utilized for image processing. Here, a white pixel is defined as 255 and a black pixel as 0. The variable $x_{i,j}$ denotes a grayscale value of a pixel as an input and $x'_{i,j}$ is the diffused error accumulated from the neighbor processed pixels. The variable $v_{i,j}$ is the modified gray output and $y_{i,j}$ represents a binary output, i.e. a pixel value of the halftone image, at the position (i, j). In addition, the variable $e_{i,j}$ denotes the difference between the modified gray output $v_{i,j}$ and the binary output $y_{i,j}$, and the relationships of $v_{i,j}$, $y_{i,j}$ and $e_{i,j}$ are represented as below:

$$v_{i,j} = x_{i,j} + x'_{i,j}, \text{ where } x'_{i,j} = \sum_{m,n \in R} \sum \frac{e_{i+m,j+n} \times dw_{m,n}}{\text{sum}} \quad (1)$$

$$e_{i,j} = v_{i,j} - y_{i,j}, \text{ where } y_{i,j} = \begin{cases} 0, & v_{i,j} < 128 \\ 255, & v_{i,j} \geq 128 \end{cases} \quad (2)$$

where the variable $dw_{m,n}$ is a diffused weighting in the diffused matrix, and the corresponding position of the diffused weighting is defined as below:

$$\begin{bmatrix} dw_{-1,-1} & dw_{-1,0} & dw_{-1,1} \\ dw_{0,-1} & x & dw_{0,1} \\ dw_{1,-1} & dw_{1,0} & dw_{1,1} \end{bmatrix} \quad (3)$$

where the symbol x denotes the current processing pixel, and the values in the eight-neighbor connections are diffused proportions, i.e. the diffused weightings.

Note that, the error can only diffuse or propagate to neighbor pixels that have not yet been binarized, i.e. those unprocessed pixels. The key to determine whether the neighbor pixels are processed is to determine whether the member in the class matrix possesses a smaller value than the member corresponding to the current processing pixel. In the equation (1), the variable sum=$\sum_{m=-1}^{1}\sum_{n=-1}^{1} dw_{m,n}$ is the summation of the diffused weightings corresponding to those unprocessed pixels. As shown in FIGS. 3A and 3B, the error corresponding to the member value 7 of the class matrix can be propagated to the pixels corresponding to the member values 10, 15, 18, 23, and 31. The value of sum which is associated with the member value 7 in the class matrix is 7.

As mentioned above, a serious problem of a periodic appearance occurs with the halftone images generated by the dot diffusion. The periodic pattern is mainly caused by the tiling manner. FIG. 5 is a diagram showing a class tiling map used in a traditional dot diffusion. The whole sheet of original image is processed in parallel wherein each divided image block is processed according to the processing order recorded in each class matrix of the class tiling map. As shown in FIG. 5, the traditional class tiling map is constructed by arranging a plurality of class matrixes in a non-overlapping and orthogonal manner, and arranging one by one until it coincides with the size of the original image. Here, the four corners in one class matrix are labeled as top left (TL), bottom left (BL), top right (TL), and bottom right (BL), respectively. The corresponding positions in each class matrix are placed with members of the same processing order. For example, the members located at column 5 row 7 of each class matrix are all 39.

For the class tiling map constructed by 3×3 class matrixes in the aforesaid arrangement, as shown in FIG. 6, the distances between the members of the same processing order in a subject class matrix and neighboring class matrixes are equal to each other. This class matrix arrangement results in a high similarity of halftone for each image block and therefore brings about the periodic dot distribution formed on the whole sheet of halftone image.

To solve the aforesaid periodic problem, a conventional method is provided to select class matrixes in a limited manner and to arrange the selected class matrixes. This conventional method can ensure that the halftone images acquired by dot diffusion possess an excellent blue noise property. In this conventional method, a first step is to generate a set of class matrixes by rotating or transposing a class matrix, for example, eight class matrixes as shown in FIG. 7. Then, the class matrix arrangement is proceeded by selecting from the eight class matrixes. An example to illustrate the conventional method is as follows. Referring to FIG. 8A, solid lines indicate that those class matrixes have been arranged and dash lines indicate that the class matrix is currently proceeding to be arranged. The class matrixes are arranged in a non-overlapping and orthogonal manner. The class matrixes which are constructing the class tiling map are selected from the eight class matrixes shown in FIG. 7. When proceeding to select one class matrix, the selection of class matrix is limited, and particularly, to the types or contents of arranged neighboring class matrixes. Referring to FIGS. 7 and 8A, the limitations to the selection of current class matrix are listed below:

(1) The limitation from the class matrix CM I: the current class matrix should not be a class matrix of which the top-left corner is filled by TR, the bottom-left corner is filled by BR, or the left border is filled by $\overline{TRBR}$ or $\overline{BRTR}$.

(2) The limitation from the class matrix CM III: the current class matrix should not be a class matrix of which the bottom-left corner is filled by TR, the bottom-right corner is filled by BR, or the bottom border is filled by $\overline{TRBR}$ or $\overline{BRTR}$.

(3) The limitation from the class matrixes CM II and CM IV: the current class matrix should not be a class matrix of which the bottom-left corner is filled by TL, or the bottom-right corner is filled by TR.

(4) The limitation from the class matrixes CM I to CM III: the current class matrix should not be identical to any one of the class matrixes CMI to CM III.

The above limitations (1) to (3) exclude six possible choices and the class matrixes located at the positions (1, 1) and (2, 3) in FIG. 7 are remnants to be selected. Also, the class matrix located at the position (1, 1) is excluded by the above limitation (4).

As described above, in the conventional arrangement, the selection of current class matrix is extremely limited by surrounded neighboring class matrixes. The possible choices of class matrixes are mostly filtered out and therefore there are not many choices for the current class matrix. These limitations result in retrieving a periodic class tiling map. Referring to examples illustrated in FIGS. 8B to 8D, those class matrixes indicated by the same symbol with the same form or shape are identical to each other. The heavy lines indicate the border of periodic class matrixes. Apparently, this conventional method merely increases the period of class matrix arrangement, for example, increasing the period by two to four times. As can be seen, in order to reduce the periodic pattern, this method utilizes rotated or transposed class matrixes to participate the arrangement but it finally turns out just increasing the period of class matrix arrangement. The conventional arrangement has the same effect as another arrangement adopting the class matrix of a bigger size. These methods can not completely solve the periodic problem of halftone images.

Above all, the conventional arrangement utilizing the limited selection of class matrixes from rotated or transposed class matrixes merely increases the period of class matrix arrangement. The above-mentioned conventional skills are unable to solve the periodic problem of halftone images efficiently and thereby the dot diffusion is not widely used.

Therefore, it is necessary to provide a technical scheme to overcome the disadvantages of the above conventional skills.

SUMMARY OF THE INVENTION

An objective of the present invention is to provide a digital halftoning method and a method for constructing a class tiling map based upon dot diffusion for improving the halftone image quality, and at the same time maintaining a parallel processing property inherently existed in the dot diffusion.

Another objective of the present invention is to provide a digital halftoning method and a method for constructing a class tiling map based upon dot diffusion, for solving the periodic problem of halftone images, and at the same time maintaining an excellent blue noise property of the halftone images.

To achieve the above objectives, the present invention provides a digital halftoning method comprises steps of: providing a class matrix and a diffused matrix, the class matrix recording a sequence to process each pixel in an image block, the diffused matrix recording diffused weightings for propagating errors to neighbor pixels; performing a similarity operation to the class matrix to obtain a plurality of similar class matrixes, the class matrix and the similar class matrixes constituting a class matrix set; selecting appropriate class matrixes from the class matrix set and arranging the selected class matrixes in a staggering form to construct a class tiling map, in which adjacent class matrixes exist a staggering shift; and processing an original image by performing a dot diffusion procedure with the class tiling map and the diffused matrix to generate a halftone image corresponding to the original image.

In another aspect, the present invention provides a method for constructing a class tiling map comprising steps of: performing a similarity operation to a class matrix to obtain a plurality of similar class matrixes, the class matrix and the similar class matrixes constituting a class matrix set; and selecting appropriate class matrixes from the class matrix set and arranging the selected class matrixes in a staggering form to construct the class tiling map, in which adjacent class matrixes exist a staggering shift.

In the present invention, the class matrixes are arranged in a staggering form. This staggering arrangement can remarkably increase the selectivity of those class matrixes provided for arrangement, and thereby solving the problem of the decrease of possible choices of class matrixes occurred in the conventional method. Therefore, the present invention is capable of solving the periodic problem of halftone images efficiently, and at the same time the halftone images acquired by utilizing the present invention can maintain an excellent blue noise property. Therefore, the dot diffusion can be widely used or applied to the market. In addition, the present invention also utilizes to optimize the class matrix and the diffused matrix and thereby the acquired halftone image has a higher similarity to the original image. The acquired halftone quality is quite high in the present invention.

BRIEF DESCRIPTION OF THE DRAWINGS

FIG. 3A is a diagram showing a class matrix.

FIG. 3B is a diagram showing a diffused matrix.

Figure 6:
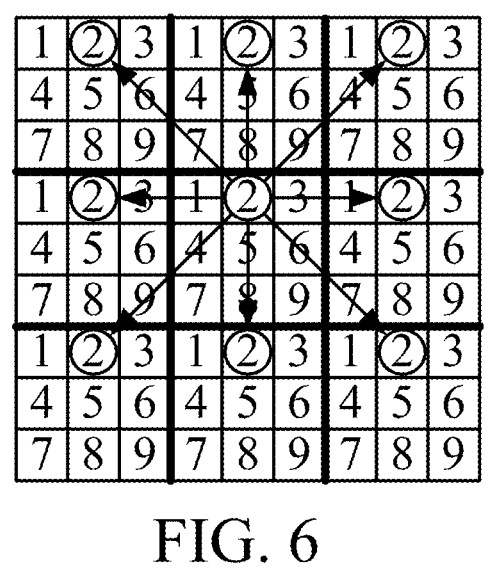

FIG. 6 is a diagram showing a relationship of members of adjacent class matrixes in the traditional dot diffusion.

Figures 8B, 8C, 8D:
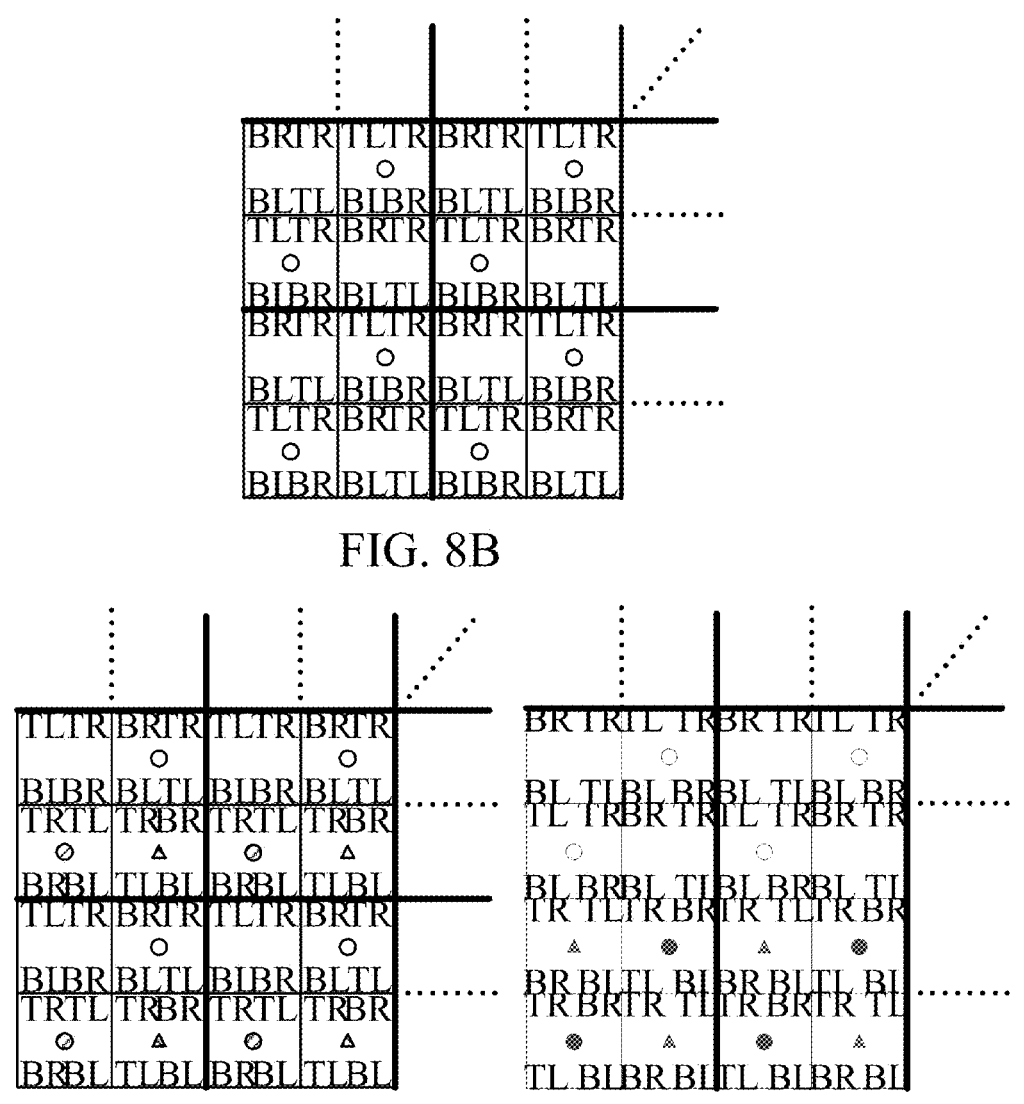

FIG. 8B is a diagram showing an example of limited selection of class matrixes in the conventional class matrix arrangement.

FIG. 8C is a diagram showing another example of limited selection of class matrixes in the conventional class matrix arrangement.

FIG. 8D is a diagram showing still another example of limited selection of class matrixes in the conventional class matrix arrangement.

FIG. 11A is a diagram showing that adjacent class matrixes should not have members of the same processing order on a border according to Rule I.

FIG. 11B is a diagram showing that adjacent class matrixes should not have members of the same processing order at a corner according to Rule I.

FIG. 11C is a diagram showing that adjacent class matrixes should not have a similar arrangement of the same set of members on the border according to Rule I.

FIG. 11D is a diagram showing that two identical class matrixes should not be arranged adjacent to each other according to Rule II.

FIG. 16A is a diagram showing a class matrix used in the present invention.

FIG. 16B is a diagram showing a diffused matrix used in the present invention.

FIG. 18A is a flow chart of an example of a class matrix optimization of the present invention.

DETAILED DESCRIPTION OF THE INVENTION

Figure 9:
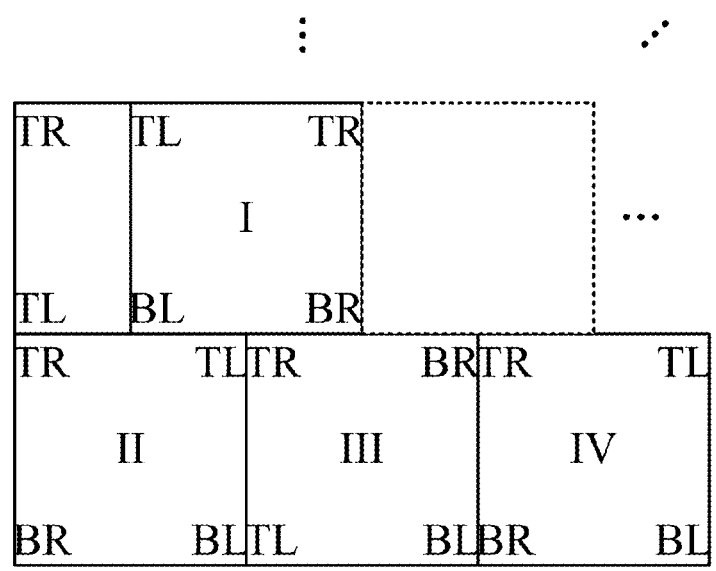
FIG. 9 is a diagram illustrating a class matrix arrangement implemented according to the present invention.
Figure 10:
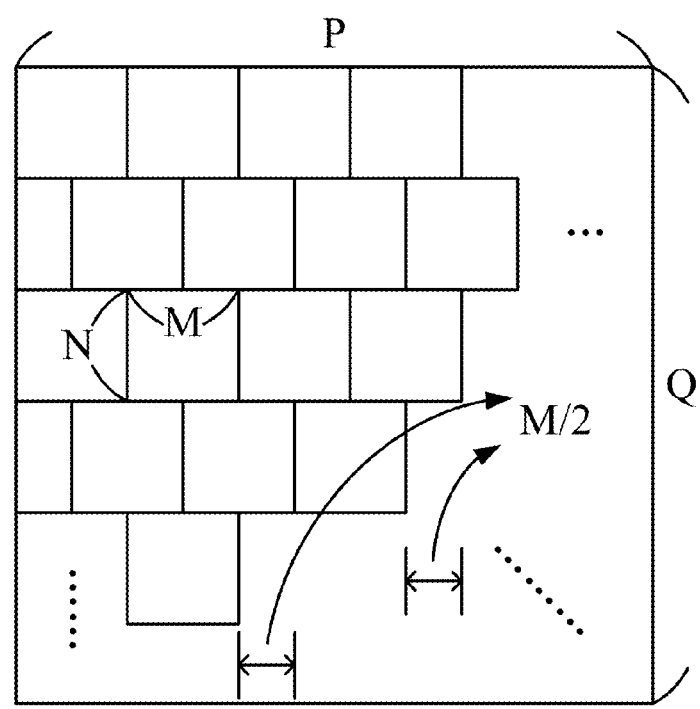
FIG. 10 is a diagram showing a class tiling map implemented according to the present invention.

FIG. 9 is a diagram illustrating a class matrix (CM) arrangement implemented according to the present invention. In FIG. 9, solid lines indicate that those class matrixes have been arranged and dash lines indicate that the class matrix is currently proceeding to be arranged. The class matrixes are arranged one by one so as to construct a class tiling map as shown in FIG. 10. The present invention is to arrange the class matrixes in a staggering form such that adjacent class matrixes in the constructed class tiling map exist a staggering shift. For example, one row of class matrixes is dislocated with another adjacent row such that class matrixes at the adjacent rows exist a shift of ½ width, as shown in FIGS. 9 and 10. This staggering arrangement can remarkably increase the selectivity of those class matrixes provided for arrangement, and therefore solving the problem of the decrease of possible choices of class matrixes.

Figure 1A:
FIG. 1A is a diagram showing an original image.
Figure 1B:
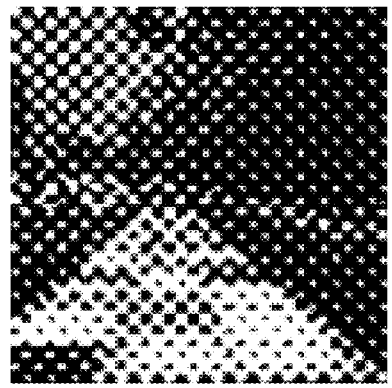
FIG. 1B is a diagram showing a halftone image acquired by performing an ordered dithering to the original image shown in FIG. 1A.
Figure 1C:
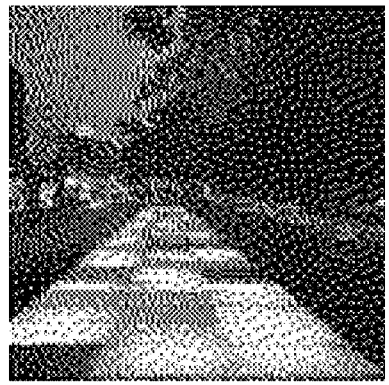
FIG. 1C is a diagram showing a halftone image acquired by performing an error diffusion to the original image shown in FIG. 1A.
Figure 1D:
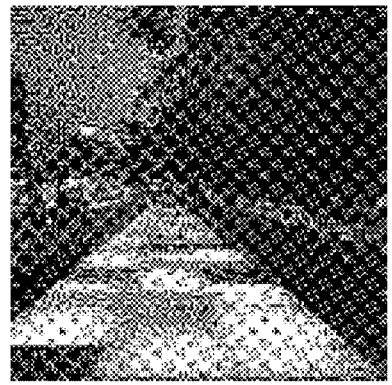
FIG. 1D is a diagram showing a halftone image acquired by performing a dot diffusion to the original image shown in FIG. 1A.
Figure 2:
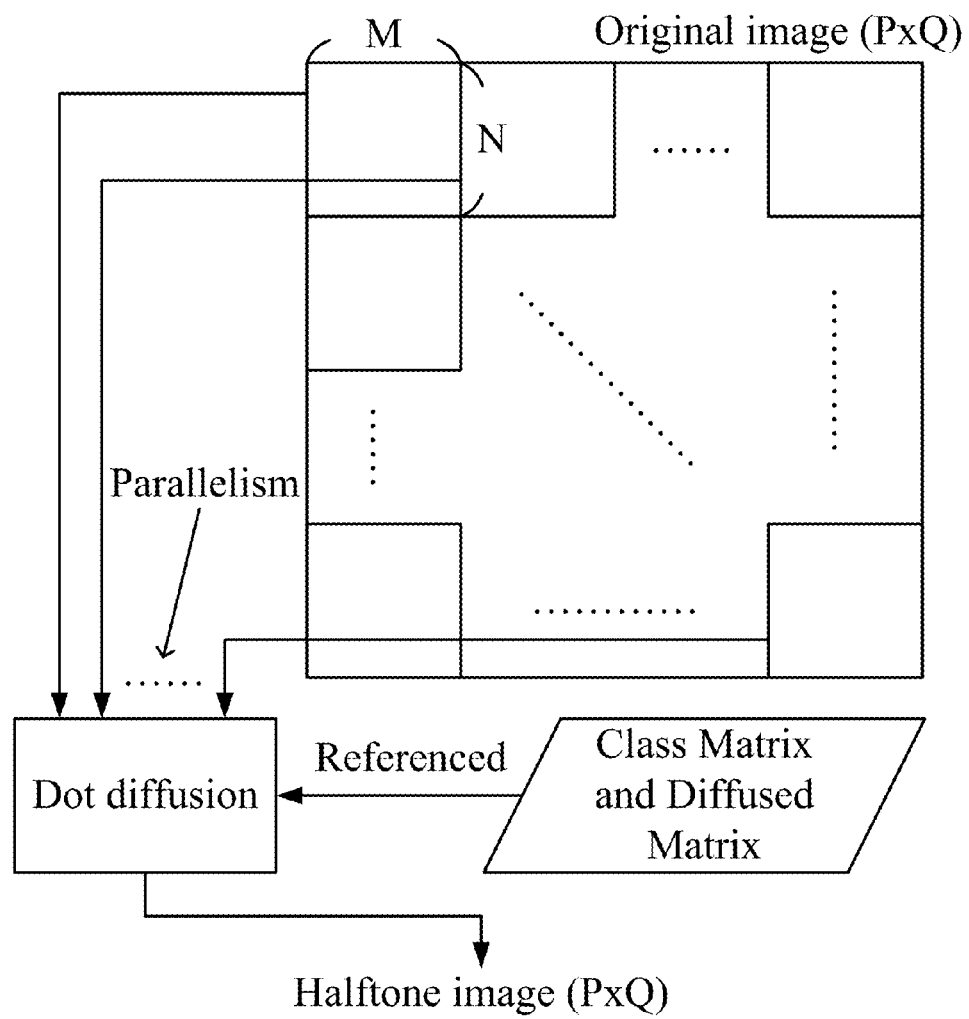
FIG. 2 is a flow chart illustrating the basic concepts of the dot diffusion.
Figure 4:
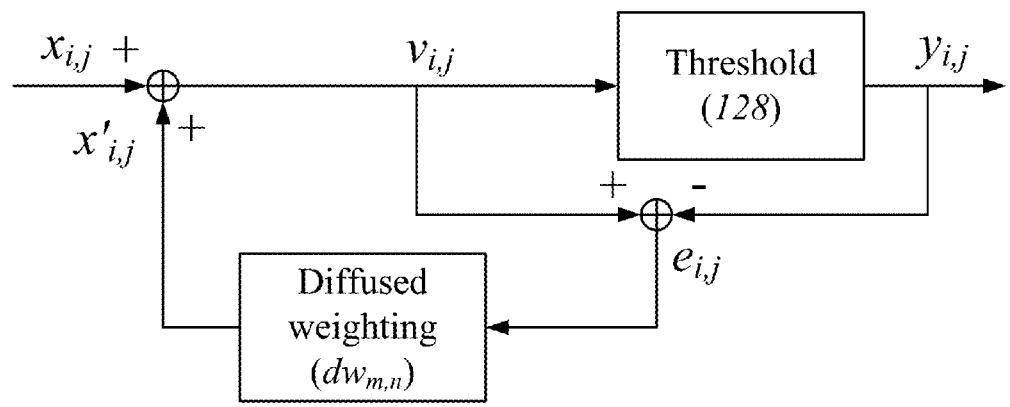
FIG. 4 is a flow chart of the dot diffusion utilized for image processing.
Figure 5:
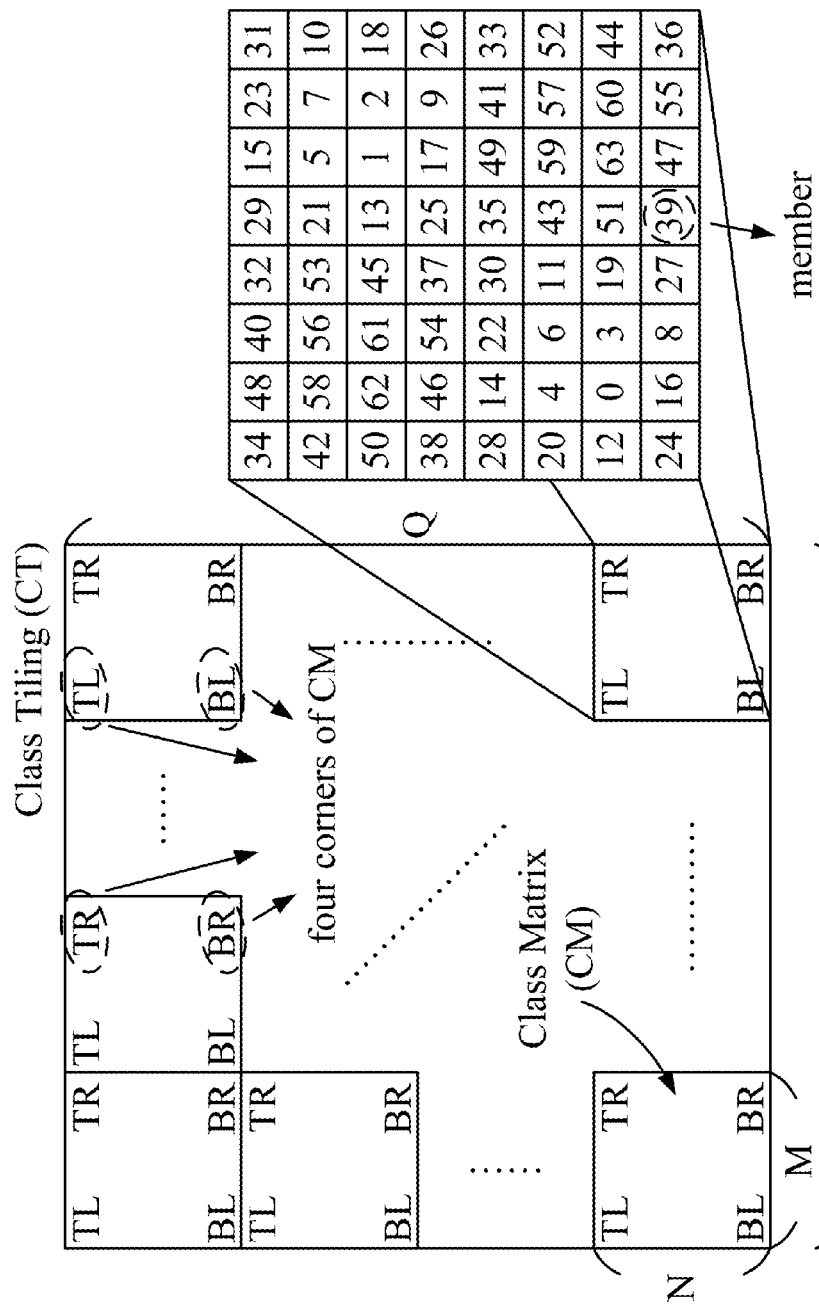
FIG. 5 is a diagram showing a class tiling map used in a traditional dot diffusion.
Figure 7:
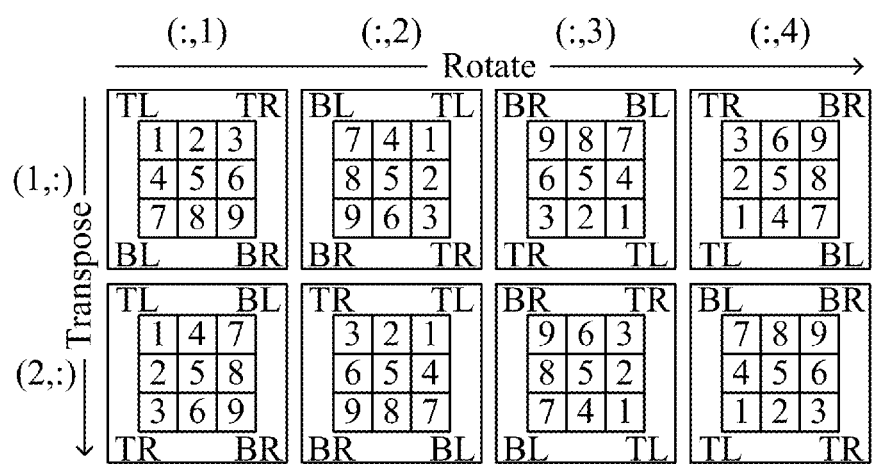
FIG. 7 is a diagram showing rotated class matrixes and transposed class matrixes.
Figure 8A:
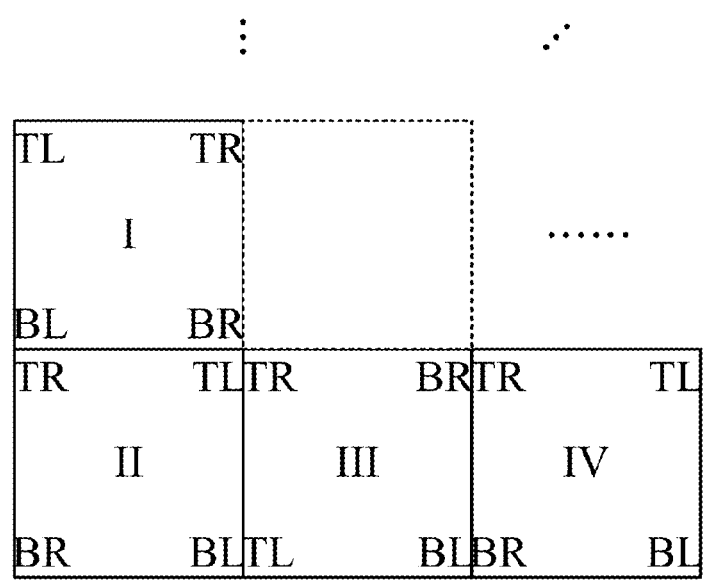
FIG. 8A is a diagram illustrating a conventional class matrix arrangement.

In the present invention, when proceeding the staggering arrangement, the class matrixes to be arranged are selected from a class matrix set. The class matrix set comprises a set of similar class matrixes, for example, the assembly of the rotated and the transposed class matrixes as shown in FIG. 7. Moreover, in order to ensure that the halftone images acquired by dot diffusion possess an excellent blue noise property, the selection of class matrix is limited in the present invention, and particularly, is limited to the types or contents of neighbor arranged class matrixes. Specifically, the selection of current class matrix should comply with the following two rules which are illustrated in accompany with FIGS. 11A to 11D, wherein the heavy lines indicate the border of class matrixes and the circular areas are the portions to be noticed.

Figures 11A, 11B, 11C, 11D:
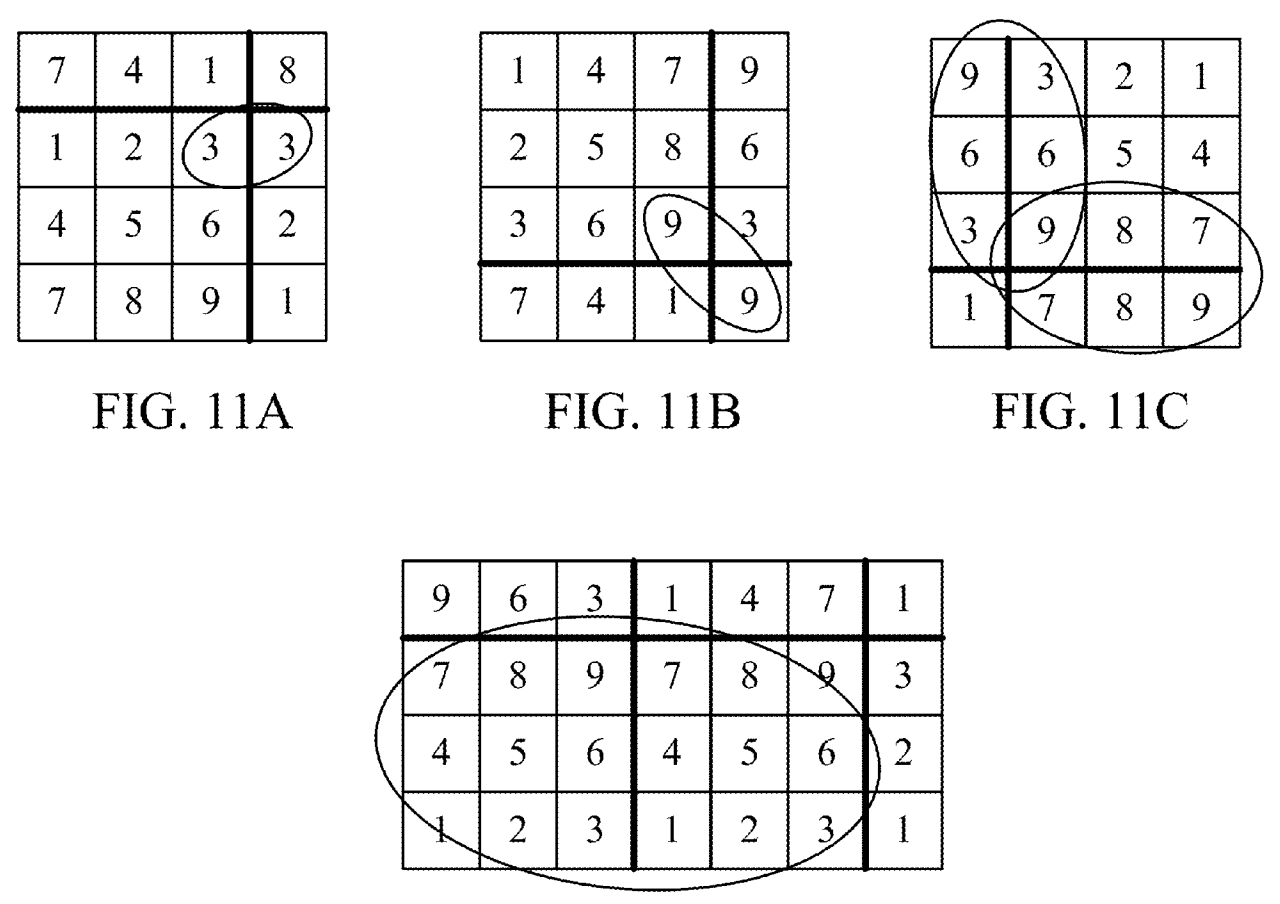

Rule I: adjacent class matrixes should not have members of the same processing order on a border and at a corner as shown respectively in FIGS. 11A and 11B, and adjacent class matrixes should not have a similar arrangement of the same set of members on the border as shown in FIG. 11C.

Rule II: two identical class matrixes should not be arranged adjacent to each other as shown in FIG. 11D.

An example for illustrating the staggering arrangement in the present invention is as follows. Referring to FIGS. 7 and 9, the limitations to the selection of current class matrix are listed below:

(1) The limitation from the class matrix CM I: the current class matrix should not be a class matrix of which the top-left corner is filled by TR, the bottom-left corner is filled by BR, or the left border is filled by $\overline{TRBR}$ or $\overline{BRTR}$.

(2) The limitation from the class matrix CM III: since the class matrixes are shifted by a half width, the selection of current class matrix should exclude a class matrix of which the bottom-left corner is filled by BR and the bottom-right corner is filled by TR in order to avoid members overlapping in a middle position of the border but the current class matrix is allowed to be a class matrix of which the bottom-left corner is filled by TR and the bottom-right corner is filled by BR.

(3) The limitation from the class matrix CM IV: since the class matrixes are shifted by a half width, the selection of current class matrix should exclude a class matrix of which the bottom-left corner is filled by TL and the bottom-right corner is filled by TR in order to avoid members overlapping in a middle position of the border but the current class matrix is allowed to be a class matrix of which the bottom-left corner is filled by TR and the bottom-right corner is filled by TL.

(4) The limitation from the class matrixes CM I to CM IV: the current class matrix should not be identical to the class matrix CM I.

Above all, since the class matrix CM II is not adjacent to the current class matrix, the selection of the current class matrix is not affected by the class matrix CM II. The limitations from the class matrixes CM II to CM IV merely exclude two possible choices located at the positions (1, 2) and (2, 4) in FIG. 7. This means that the staggering arrangement of the present invention can efficiently increase the selectivity of those class matrixes provided for arrangement, and does not have the problem of the decrease of possible choices of class matrixes occurred in the conventional method. Therefore, the present invention is capable of solving the periodic problem of halftone images efficiently, and at the same time the halftone images acquired by utilizing the present invention can maintain an excellent blue noise property. Therefore, the dot diffusion can be widely used or applied to the market.

Figure 12:
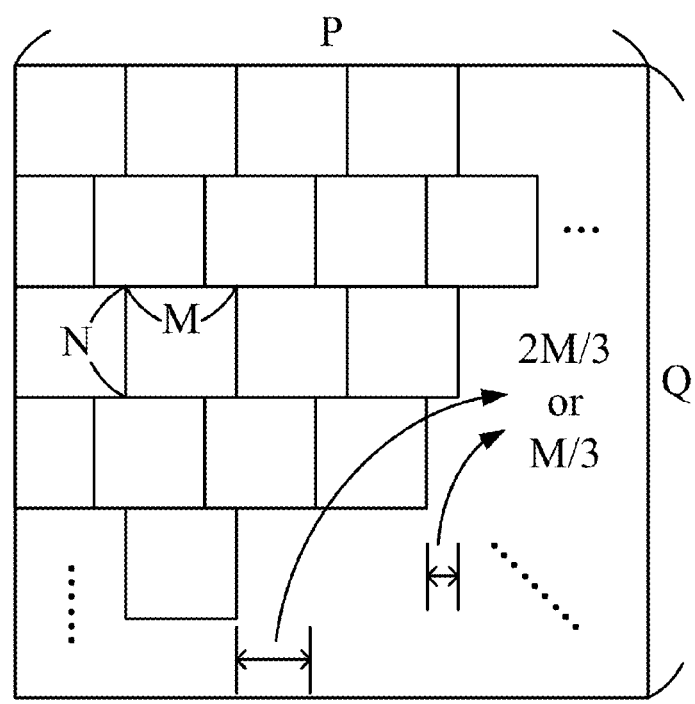
FIG. 12 is a diagram illustrating another class matrix arrangement implemented according to the present invention.
Figure 13:
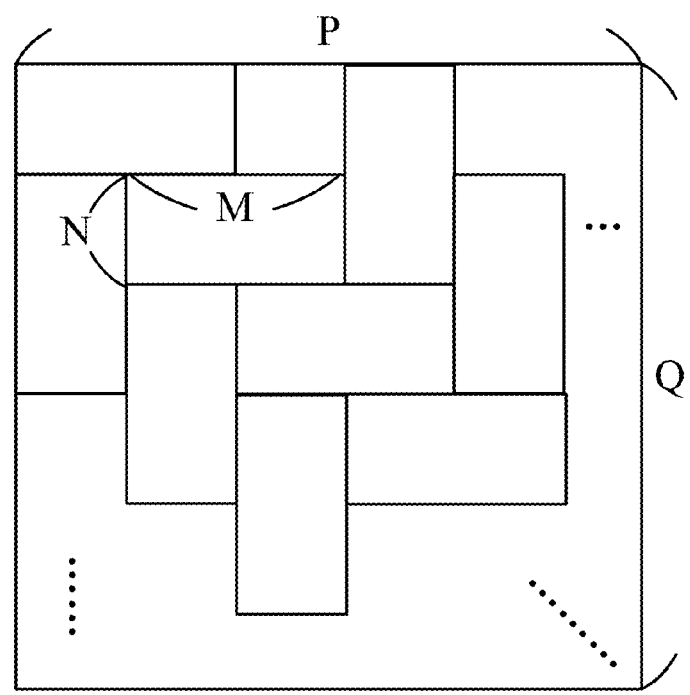
FIG. 13 is a diagram showing a staggering arrangement utilizing rectangular class matrixes.
Figure 14:
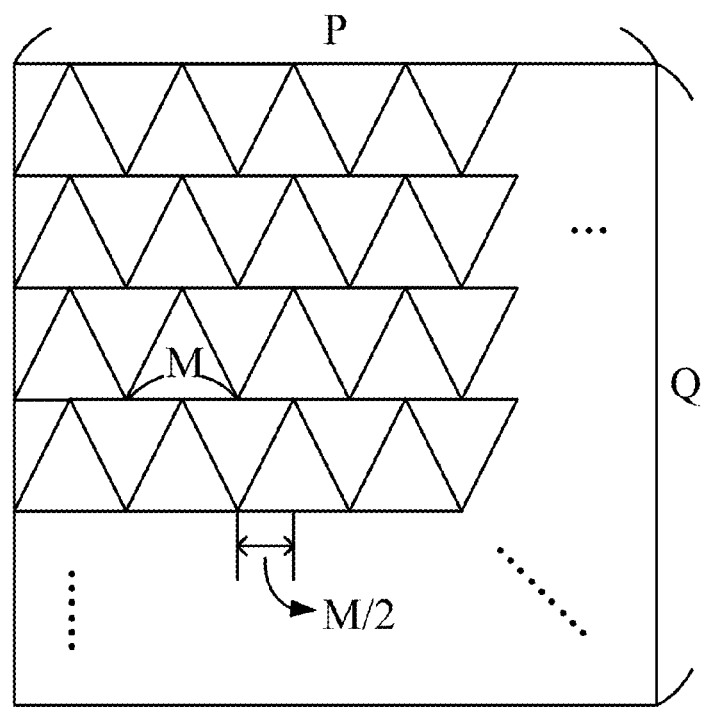
FIG. 14 is a diagram showing another staggering arrangement utilizing triangular class matrixes.

In one embodiment, when proceeding the staggering arrangement, the current class matrix and one of the adjacent class matrixes are arranged to be a zigzag or alternating arrangement such that the two class matrixes exist a predetermined staggering shift therebetween, for example, a staggering shift of ⅓ or ⅔ width as shown in FIG. 12. In another embodiment, when proceeding the staggering arrangement, members of the class matrix are not limited to be arranged in a square pattern. The class matrix having members which are arranged in a rectangular pattern (as shown in FIG. 13) or a triangular pattern (as shown in FIG. 14), can be utilized for the staggering arrangement to construct the class tiling map as well.

Figure 15:
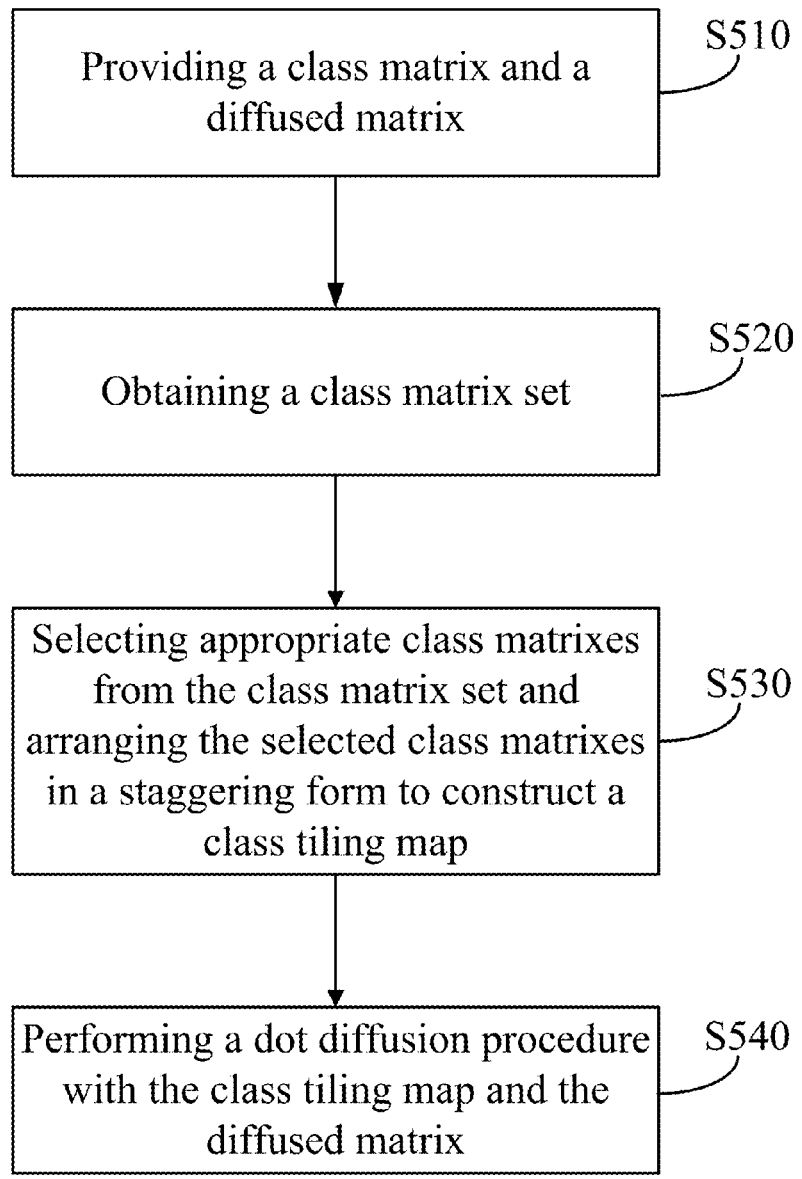
FIG. 15 is a flow chart of a digital halftoning method implemented according to the present invention.

FIG. 15 is a flow chart of a digital halftoning method implemented according to the present invention. The digital halftoning method of the present invention comprises the following steps.

In Step S510, a class matrix and a diffused matrix (DM) are provided. The class matrix records a sequence to process each pixel in an image block and the diffused matrix records diffused weightings for propagating errors to neighbor pixels. The class matrix and the diffused matrix can be optimized in advance. The optimization procedures will be described later. The class matrix and diffused matrix used in the present invention are exemplarily shown in FIGS. 16A and 16B, respectively.

In Step S520, a similarity operation is performed to the class matrix so as to obtain a plurality of similar class matrixes. The class matrix and the similar class matrixes constitute a class matrix set. For example, a rotation operation or a transposition operation is performed to the class matrix so as to generate several similar class matrixes as illustrated by the 3×3 class matrixes exemplarily shown in FIG. 7.

In Step S530, a class tiling map is constructed. In this step, it is to select appropriate class matrixes from the class matrix set obtained in Step S520, and arrange the selected class matrixes one by one in a staggering form as shown in FIGS. 9 and 10. In each individual procedure for arranging each class matrix, the staggering arrangement should comply with the two afore-mentioned rules so as to exclude inappropriate class matrixes and randomly select one class matrix from the remaining class matrixes to be arranged. In this manner, the selected class matrixes are arranged to construct the class tiling map gradually. In the present invention, adjacent class matrixes in the class tiling map exist a staggering shift therebetween. The staggering shift can be one half or one third of an edge of the class matrix, or spans any predetermined length. In addition, members of the class matrix can be arranged in a square pattern as shown in FIGS. 10 and 12, or a rectangular pattern as shown in FIG. 13, or other shapes such as a triangle as shown in FIG. 14.

In Step S540, it is to process an original image by performing a dot diffusion procedure with the class tiling map obtained in Step S530 and the diffused matrix provided in Step 510 to generate a halftone image corresponding to the original image. In an implementation, it can manufacture a class tiling map of a bigger size at first and then cut out the class tiling map corresponding to the size of the original image. Also, the original image is divided into a plurality of blocks and each image block corresponds to the size of the class matrix. Each image block is parallel processed by the dot diffusion procedure. In addition, the class matrixes in the class matrix set obtained in Step S520 can be numbered one after another sequentially, at first. The class tiling map can be stored in a form of the number data, and therefore storage space or memory can be reduced.

Diffused Matrix Optimization:

The present invention utilizes an LMS (Least-Mean-Square) filter, which is obtained by comparing one or plural grayscale images and corresponding halftone results of the grayscale images, to optimize the diffused matrix. The values inside the LMS filter can be taken as diffused weightings of the diffused matrix and the size of the LMS filter can be taken as a diffused area or the size of the diffused matrix. Those grayscale images are used for training, and thus called training images. These images can be easily accessed from a public image database. The corresponding halftone result of each training image is composed of binary output values, for example 0, 255, and can be obtained from various kinds of halftoning methods, for example, dot diffusion, error diffusion, ordered dithering and direct binary search (DBS).

Figure 17:
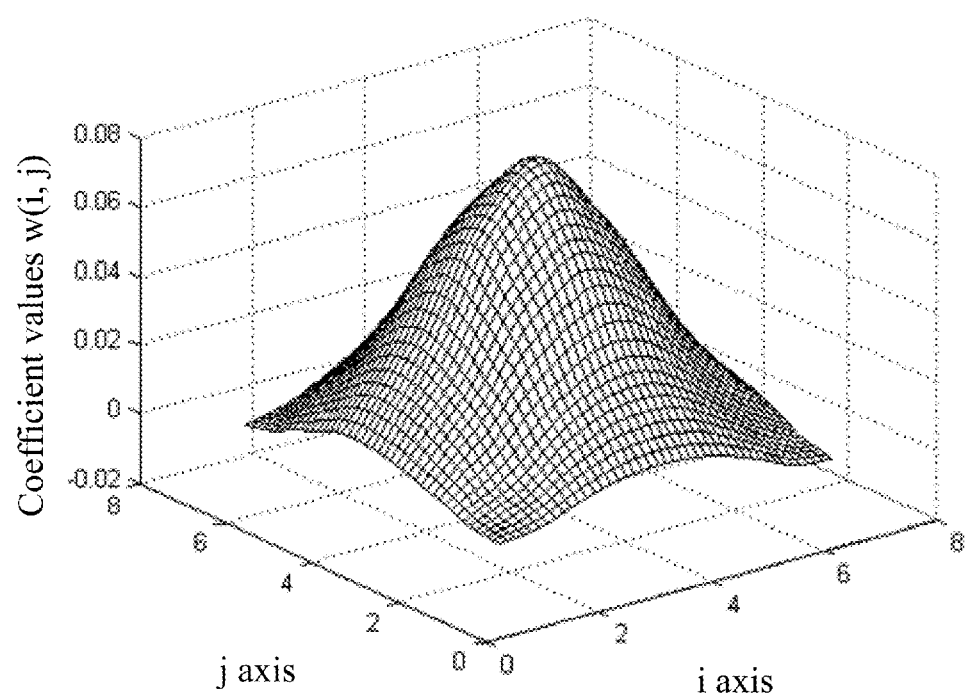
FIG. 17 is a diagram showing an LMS (Least-Mean-Square) filter obtained in a diffused matrix optimization of the present invention.

The LMS filter trained by using the training images and their halftone results is called an LMS-trained filter. The LMS-trained filter has the characteristics of Human Visual System (HVS), and the characteristics are referred to that (1) the diagonal has less sensitivity than the vertical and horizontal directions and (2) the center portion has the highest sensitivity and it decreases while moving away from the center. Here, the diffused weightings of the LMS-trained filter are obtained by the following equations:

$$\hat{x}_{i,j} = \sum_{m,n \in R} \sum w_{m,n} b_{i+m,j+n}, \quad (4)$$

$$e_{i,j}^2 = (x_{i,j} - \hat{x}_{i,j})^2, \quad (5)$$

$$\frac{\partial e_{i,j}^2}{\partial w_{m,n}} = -2e_{i,j}b_{i+m,j+n}, \quad (6)$$

$$\begin{cases} \text{If } w_{m,n} > w_{m,n,opt}, \text{slope} > 0, w_{m,n} \text{ should be decreased} \\ \text{If } w_{m,n} < w_{m,n,opt}, \text{slope} < 0, w_{m,n} \text{ should be increased} \end{cases} \quad (7)$$

$$w_{m,n}^{(k+1)} = w_{m,n}^k + \mu e_{i+m,j+n} b_{i+m,j+n}, \quad (8)$$

where $x_{i,j}$ is a grayscale value of a training image, $b_{i,j}$ is the corresponding halftone result of the training image, $w_{m,n}$ is the diffused weightings, $w_{m,m,opt}$ is an optimum LMS coefficient at the beginning, $e_{i,j}^2$ is the mean squared error (MSE) between $x_{i,j}$ and $\hat{x}_{i,j}$, and $\mu$ is an adjusting parameter used to control convergent speed of the LMS optimum procedure. The LMS-trained filter obtained by the above-described manner is illustrated in FIG. 17.

For the diffused matrix optimization, it needs to evaluate the quality of a halftone image. The quality of the halftone image can be evaluated by human-visual peak signal-to-noise ratio (HPSNR) which coincides with the characteristics of Human Visual System, and the HPSNR is defined as:

$$HPSNR = 10\log_{10} \frac{P \times Q \times 255^2}{\sum_{i=1}^{P}\sum_{j=1}^{Q}[\sum_{m,n \in R}\sum w_{m,n}(x_{i+m,j+n} - b_{i,m,j+n})]^2} \quad (9)$$

where $x_{i,j}$ is a grayscale value of an image, $b_{i,j}$ is the corresponding halftone result, $w_{m,n}$ represents selected diffused weightings inside an LMS-trained filter at position (m,n), and R is a support region of the LMS-trained filter. Note that, any LMS-trained filter can be selected to participate in the performance evaluation. In addition, the halftone quality evaluation is also used in the successive class matrix optimization.

Class Matrix Optimization:

To optimize the class matrix, each member in the class matrix is successively swapped with one of the other members and applied to a set of testing images. The quality evaluation approach introduced above is employed to evaluate the average HPSNRs of the corresponding dot-diffused halftone images. The average HPSNR of the halftone images utilized the class matrix is compared with the average HPSNR of the halftone images utilized the swapped class matrix. Only the swapped result with a highest average HPSNR will be retained as a new class matrix, and then the same above-mentioned swapping procedure is conducted until no other further swapping can improve the average HPSNR.

FIG. 18A is a flow chart of an example of the class matrix optimization. Suppose a class matrix of size 8×8 is to be optimized.

In Step S810, one of LMS-trained filters of sizes 3×3, 5×5, 7×7 and 9×9 is selected, for example, a 3×3 LMS-trained filter is selected. The values inside the LMS-trained filter are taken as diffused weightings and the size of the LMS-trained filter is taken as a diffused area.

In Step S820, an initial class matrix is given in a random fashion. The members within the initial class matrix are taken as 1-D sequence.

In Step S831, a member C(i) in the class matrix is selected.

In Step S832, the member C(i) in the class matrix is swapped with one of the other 63 members C(j), where i≠j.

In Step S840, a dot diffusion procedure is performed with the LMS-trained filter selected from Step S810 and the class matrix to a set of testing images to obtain corresponding dot-diffused halftone testing images, which may be called first halftone testing images. Similarly, the same dot diffusion procedure is performed with the LMS-trained filter and the swapped class matrix to those testing images to obtain corresponding halftone testing images, which may be called second halftone testing images. The testing images can be any natural images. Any grayscale images with various kinds of grayscale values can be adopt for serving as the testing images.

In Step S850, the average HPSNR of the first halftone testing images and the average HPSNR of the second halftone testing images are evaluated.

In Step S860, the average PSNR of the first halftone testing images and the average PSNR of the second halftone testing images are compared to determine whether the swapped class matrix leads to the highest reconstructed image quality. If so, the swapped class matrix is taken as a new class matrix. Otherwise, the class matrix is used for above-mentioned swapping procedures.

If not all the members C(j) in the class matrix are swapped with the member C(i), it will go to Step S832 for swapping another member C(j). After all the members C(j) have been swapped with the member C(i), another member C(i) is selected to swap. If not all the members C(i) are selected, it will go to Step S831 for swapping another member C(i) that has not been selected. If no further swapping can improve the quality of the reconstructed dot-diffused image, the optimization procedure is terminated and an optimized class matrix is thus determined. Otherwise, Step S831 to Step S860 are iteratively performed.

Figure 18B:
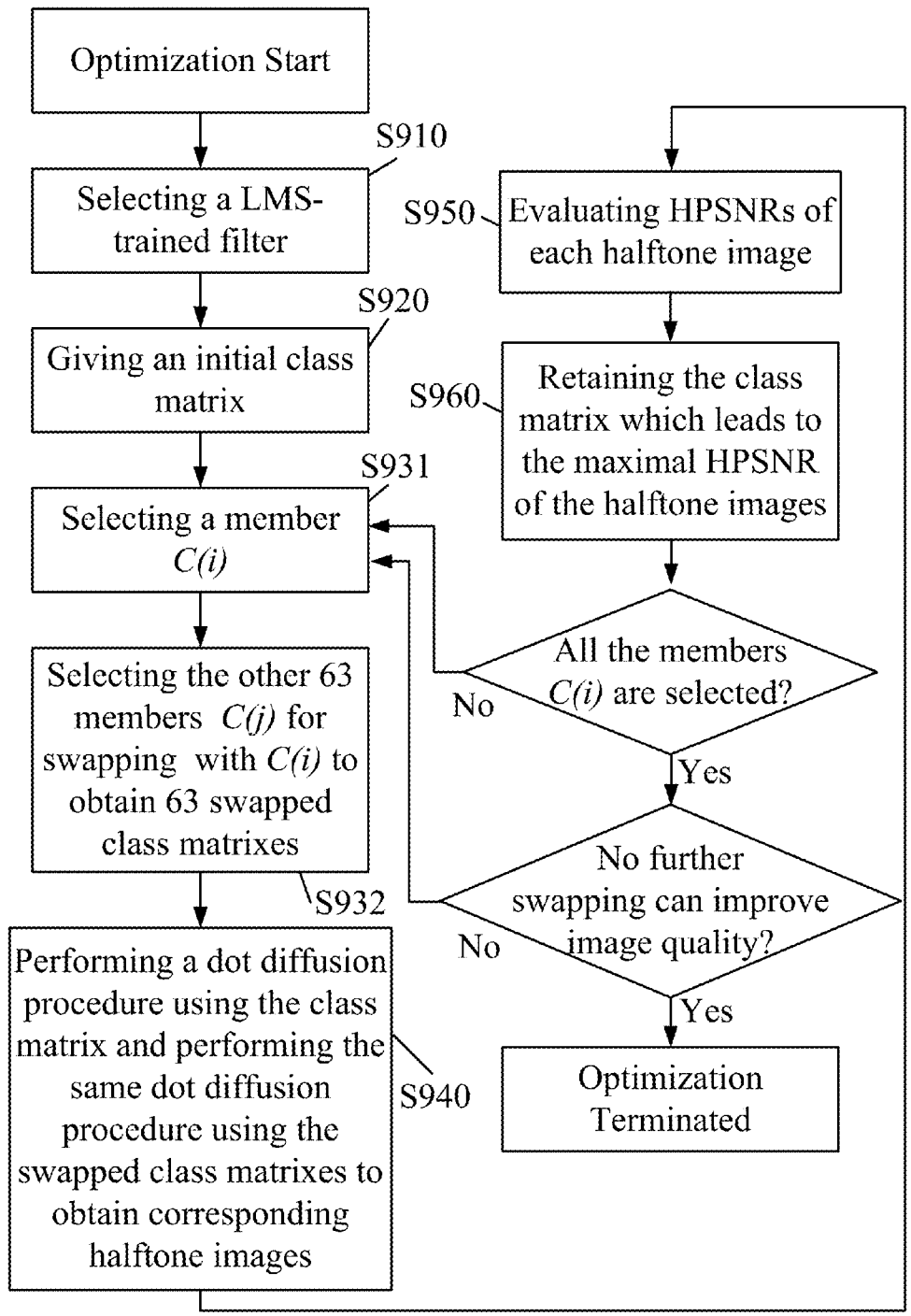
FIG. 18B is a flow chart of another example of the class matrix optimization of the present invention.

FIG. 18B is a flow chart of another example of the class matrix optimization. Suppose a class matrix of size 8×8 is to be optimized. Since Steps S910, S920, S931 are similar to Steps S810, S820, S831 in FIG. 18A, the description of Steps S910, S920, S931 will be omitted herein for clear and concise description.

In Step S932, the member C(i) in the class matrix is swapped with the other 63 members C(j), where i≠j. Thus, 63 swapped class matrixes are obtained.

In Step S940, a dot diffusion procedure is performed with the LMS-trained filter selected from Step S910 and the class matrix, and the same dot diffusion procedure is performed with the LMS-trained filter and the swapped class matrixes to a testing image to obtain corresponding dot-diffused halftone images. The dot diffusion procedure may also be performed to a set of testing images. Here, one testing image is taken for an example.

In Step S950, HPSNRs of each halftone image are evaluated. There are 64 HPSNR results corresponding to 64 halftone images, where one halftone image is obtained by using the class matrix and 63 halftone images are obtained by respectively using the 63 swapped class matrixes.

In Step S960, the class matrix which leads to the maximal HPSNR of the halftone images is retained. The class matrix which has the maximal HPSNR leads to the highest reconstructed image quality and then is taken as a new class matrix.

If not all the members C(i) are selected, it will go to Step S931 for swapping another member C(i) that has not been selected. In the meanwhile, the class matrix which leads to the maximal HPSNR obtained from Step S960 is taken as a new class matrix for swapping another member C(i). If no further swapping can improve the quality of the reconstructed dot-diffused image, the optimization procedure is terminated and an optimized class matrix is thus determined.

Experimental Results:

The halftone image quality and the periodic appearance are two major aspects to be evaluated in the following sections. The HPSNRs of the halftone images acquired by the present invention, and the other three dot diffusions respectively by Knuth, Mese-Vaidyanathan, and Guo-Liu are listed in FIG. 19. The experimental results show that the halftone image quality of the present invention earns the highest quality against the other conventional dot diffusions. In another aspect, the halftone images acquired by the conventional dot diffusions are periodic in an appearance no matter how to change the contents of the class matrix and the diffused matrix. The present invention changes the tiling manner and arranges the class matrixes in a staggering form, and therefore is capable of solving the periodic problem. In the meanwhile, the halftone image acquired by the present invention has a higher similarity to the original image. The present invention can improve the halftone quality as the results shown in FIG. 9.

Figure 19:
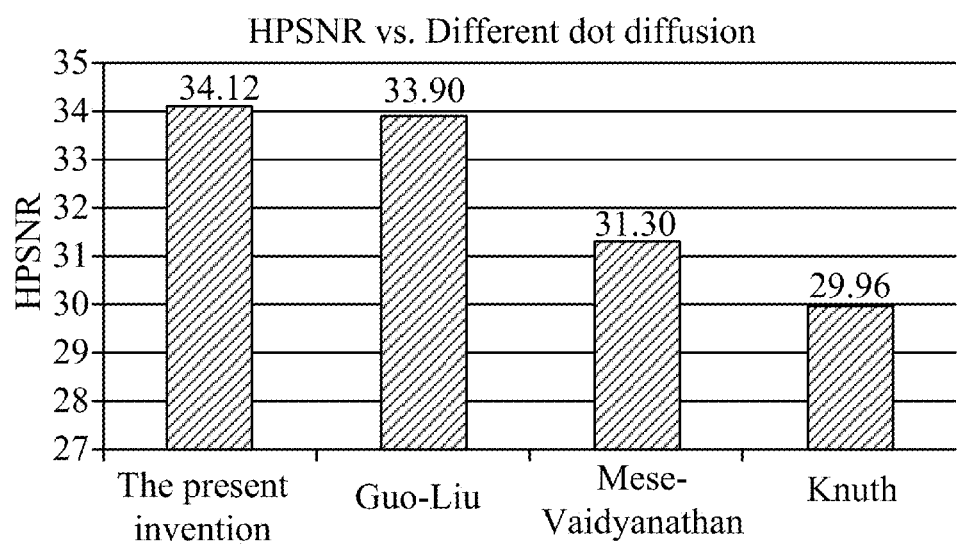
FIG. 19 is a diagram showing a comparing chart of halftone image quality acquired by the present invention and the other conventional dot diffusions.
Figure 20B:
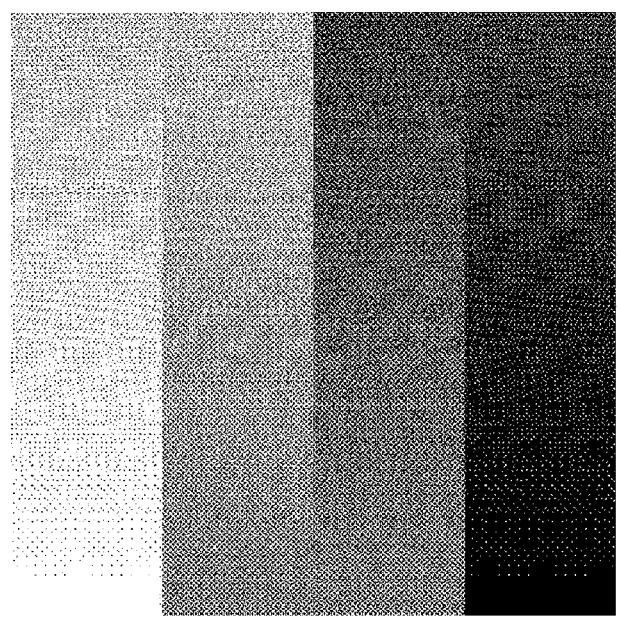
FIG. 20B is a diagram showing a halftone image acquired by utilizing the present invention.
Figure 20A:
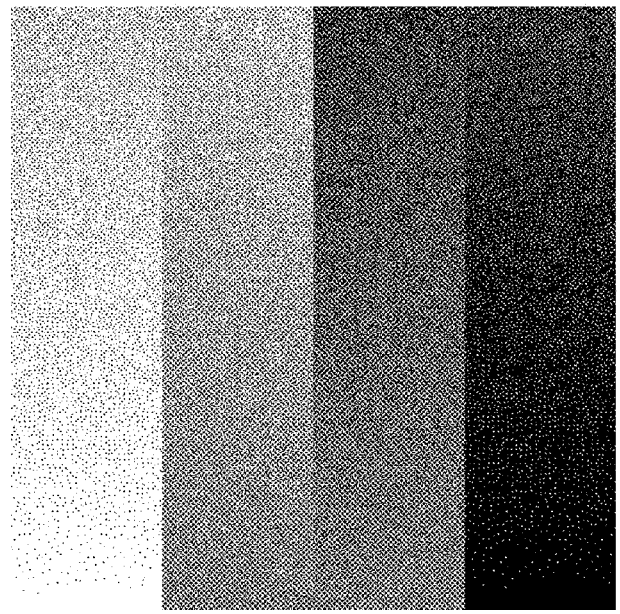
FIG. 20A is a diagram showing a halftone image acquired by utilizing the Guo-Liu dot diffusion.

Referring to FIG. 19, the HPSNR quality of the halftone image which is generated by the Guo-Liu dot diffusion is the closest to the present invention. The periodic appearances in these two skills are compared herein. FIG. 20A is a halftone image acquired by utilizing the Guo-Liu dot diffusion. FIG. 20B is a halftone image acquired by utilizing the present invention. Apparently, a serious problem of the periodic appearance occurs in the conventional Guo-Liu dot diffusion; however, the present invention does not have the disadvantage of the conventional Guo-Liu dot diffusion, and hence the present invention is capable of improving the visual comfort for spectators.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A digital halftoning method, comprising steps of:
   (a1) providing a class matrix and a diffused matrix, the class matrix recording a sequence to process each pixel in an image block, the diffused matrix recording diffused weightings for propagating errors to neighbor pixels;
   (a2) performing a similarity operation to the class matrix for obtaining a plurality of similar class matrixes, the class matrix and the similar class matrixes constituting a class matrix set;
   (a3) selecting appropriate class matrixes from the class matrix set and arranging the selected class matrixes in a staggering form to construct a class tiling map, in which adjacent class matrixes exist a staggering shift; and
   (a4) processing an original image by performing a dot diffusion procedure with the class tiling map and the diffused matrix to generate a halftone image corresponding to the original image.

2. The method of claim 1, wherein in the step (a2), a similarity operation is an operation to rotate or transpose the class matrix.

3. The method of claim 1, wherein in the step (a3), a predetermined rule is utilized to select the appropriate class matrixes, the predetermined rule refers to that adjacent class matrixes should not have members of the same processing order on a border and at a corner, adjacent class matrixes should not have a similar arrangement of the same set of members on the border, and two identical class matrixes should not be arranged to be adjacent to each other.

4. The method of claim 1, wherein members of the class matrix are arranged in a square, a rectangular, or a triangular pattern.

5. The method of claim 1, further comprising a step of optimizing the diffused matrix, wherein at least a training image and a halftone result corresponding to the training image are compared so as to obtain an LMS (Least-Mean-Square) filter to optimize the diffused matrix.

6. The method of claim 1, further comprising a step of optimizing the class matrix, which comprises sub-steps of:
   (b1) selecting a member of the class matrix;
   (b2) swapping the selected member of the class matrix with one of the other members;
   (b3) performing a dot diffusion procedure with the class matrix to at least a testing image to obtain a first halftone image and performing the same dot diffusion procedure with the swapped class matrix obtained from the swapping step (b2) to the testing image to obtain a second halftone image;
   (b4) comparing a peak signal-to-noise ratio (PSNR) of the first halftone image and a PSNR of the second halftone image to obtain a comparing result; and
   (b5) retaining either the class matrix or the swapped class matrix that results in a higher PSNR, according to the comparing result.

7. The method of claim 1, further comprising a step of optimizing the class matrix, which comprises sub-steps of:
   (c1) selecting a member of the class matrix;
   (c2) swapping the selected member of the class matrix with the other members to obtain a plurality of swapped class matrixes;
   (c3) performing a dot diffusion procedure with the class matrix and performing the same dot diffusion procedure with the swapped class matrixes to at least a testing image to obtain corresponding halftone images;
   (c4) evaluating peak signal-to-noise ratios (PSNRs) of each corresponding halftone image; and
   (c5) retaining either the class matrix or one of the swapped class matrixes results in a maximal PSNR of the corresponding halftone images.

8. A method for constructing a class tiling map, comprising steps of:
   (d1) performing a similarity operation to a class matrix to obtain a plurality of similar class matrixes, the class matrix and the similar class matrixes constituting a class matrix set; and
   (d2) selecting appropriate class matrixes from the class matrix set and arranging the selected class matrixes in a staggering form to construct the class tiling map, in which adjacent class matrixes exist a staggering shift.

9. The method of claim 8, wherein in the step (d1), the similarity operation is an operation to rotate or transpose the class matrix.

10. The method of claim 8, wherein in the step (d2), a predetermined rule is utilized to select the appropriate class matrixes, the predetermined rule refers to that adjacent class matrixes should not have members of the same processing order on a border and at a corner, adjacent class matrixes should not have a similar arrangement of the same set of members on the border, and two identical class matrixes should not be arranged to be adjacent to each other.

* * * * *